UNITED STATES PATENT OFFICE.

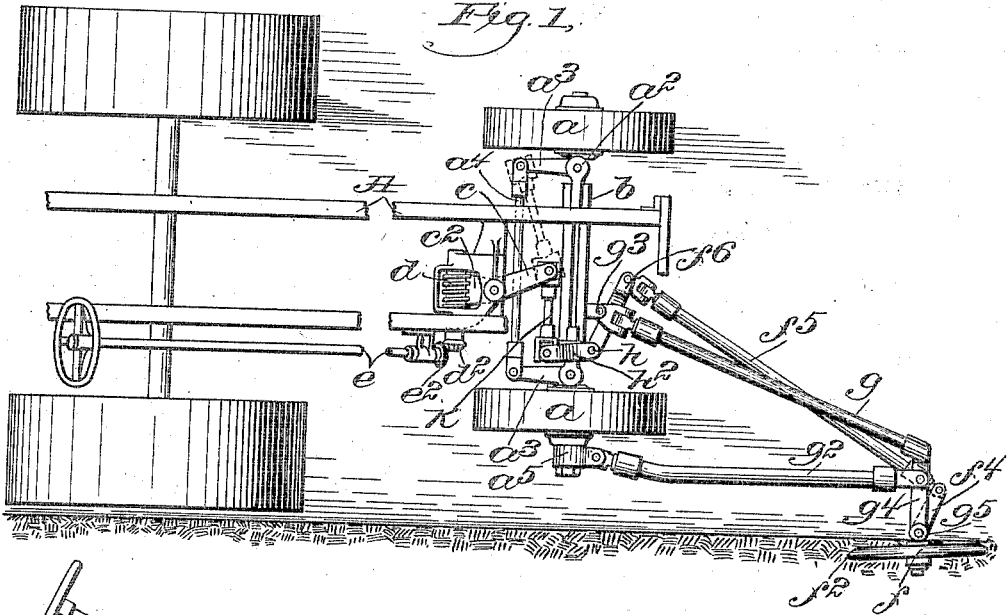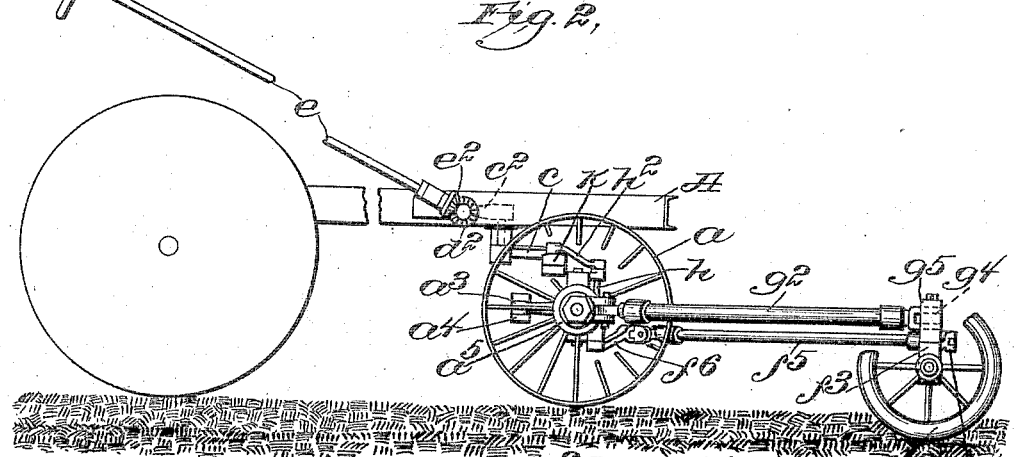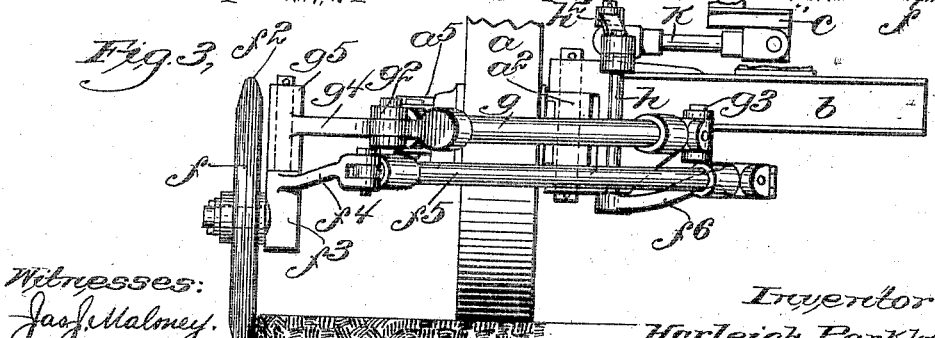

HARLEIGH PARKHURST, OF WALPOLE, NEW HAMPSHIRE.

STEERING-GEAR.

1,078,514. Specification of Letters Patent. Patented Nov. 11, 1913.

Application filed February 6, 1911. Serial No. 606,745.

*To all whom it may concern:*

Be it known that I, HARLEIGH PARKHURST, a citizen of the United States, residing in Walpole, in the county of Cheshire, State of New Hampshire, have invented an Improvement in Steering-Gear, of which the following description, in connection with the accompanying drawings, is a specification, like letters on the drawings representing like parts.

The present invention relates to a steering gear for traction engines, and is mainly intended for use with traction engines such as are now used for farming, and many other purposes, the invention relating mainly to an automatic steering device which is adapted to steer the engine without attention, if there is any vertical abutment on the surface which can be used as a guide, or which can be guided by the operator in steering the engine, if so desired.

In accordance with the invention, the main engine steering wheels are mounted on knuckles at the ends of a rigid front axle, the knuckles having vertical bearings and being connected together by a cross link after the manner of the steering gear now commonly employed in automobile construction. When the engine is to be steered in the ordinary way, as, for example, when hauling along the road, or traveling from one place to another preparatory to being used for plowing or similar purposes, one of the steering knuckles may be connected in the ordinary way with a sector to be operated by a worm through a steering wheel of the ordinary construction. If, however, the engine is to be steered automatically so, for example, as to follow a previously made furrow in plowing, or any other abutment, the sector member may be disconnected from the steering knuckle and connected with a controlling member which is adapted to operate a small steering or "guide wheel," as it may be called, which projects forward of the engine for the purpose of engaging in the furrow and causing the engine to follow the line of the same. The function of the guide wheel, when used in this way, is not directly to guide the machine by its own tracking, but to act through its own lateral movement produced by following the furrow, in turning the main steering wheels of the machine. The small guide-wheel is shown as having an inclined or beveled periphery and is set so as to turn inward toward the edge of the furrow, so that it will tend continually to climb up the furrow, being, however, forced back by the weight of the frame in which it is carried, so that it keeps in the furrow, but follows closely the edge thereof. The guide wheel is mounted on a knuckle at one end of a substantially triangular frame, one member of which is pivotally connected at the front of the machine at the inner side of one of the steering wheels, while the other member is pivoted on the wheel spindle at the other side of the said steering wheel, so that the swinging movement of the frame produced by the lateral play of the small guide wheel causes the steering wheel with which the frame is connected to turn and control the direction in which the engine is to travel. The guide wheel is mounted on a vertical pivot in the frame, and is connected with the steering post of the engine, so that it can be utilized in manually as well as automatically steering the engine. In this use, the guide wheel tracks like any steering wheel in the direction in which it is turned, but acts on the regular steering wheels, as above explained.

Figure 1 is a top plan view of a steering gear showing a sufficient portion of the frame of a traction engine to illustrate the relation of the steering gear thereto; Fig. 2 is a side elevation of the same; Fig. 3 is a front view of the steering gear and a portion of the frame on a larger scale.

The primary steering of the engine is produced through the agency of the front steering wheels $a$ mounted on vertical knuckles $a^2$ at the ends of the front axle $b$, the said knuckles having radial arms $a^3$ connected together by means of a link or connecting rod $a^4$. For ordinary steering purposes, one of the knuckles, or the connecting rod itself, may be connected with a steering arm $c$ which is shown as located below the frame A of the machine, said arm $c$ being pivoted on a vertical pin and provided with a sector $c^2$ which is engaged by a horizontal worm $d$. The said worm $d$ is provided with a bevel gear $d^2$ which meshes with a bevel gear $e^2$ at the end of the usual steering post $e$ which is shown as extended back to the rear of the machine.

A suitable connection between the arm $c$ and one of the knuckle arms $a^3$ is herein indicated in dotted lines (Fig. 1) this connection being removed when the automatic steering apparatus is to be employed. In order to steer the engine automatically for plowing, or other purposes, so that the engine will follow a previously made line of depression without attention on the part of the operator, the steering apparatus is provided, in accordance with the invention, with a supplemental guide-wheel $f$, which is shown as a small wheel which preferably has a sharpened or beveled rim $f^2$, the said wheel being mounted on a frame which projects forward of the engine, and has a lateral projection to support the wheel a little to one side of the path of travel of the engine itself. In plowing, for example, if the machine is traveling adjacent to a previously made furrow, the guide wheel will project forward and will lie in the furrow, and if the wheel is inclined slightly inward from alinement with the main wheels, it is obvious that it will tend to travel toward the cut edge of the furrow and climb out in following such a direction of movement. The tendency to continue in this direction, and climb out, however, is overcome by the weight of the frame to which the wheel is attached, which is sufficient to hold the wheel down, so that the wheel merely remains in contact with the side of the furrow, whether the same is straight or not. It is obvious, therefore, that if there are deviations from a straight line along the path of the furrow, or similar abutment, the movement of the wheel $f$ which is produced thereby will swing the frame in which the wheel is carried, and correspondingly turn the main steering wheels controlled by the frame.

In the construction shown, the frame to which the wheel $f$ is connected, consists of the two side members $g$ and $g^2$, the member $g$ being pivotally connected at $g^3$, with the front axle $b$, between the steering wheels $a$, and at the other end with the lateral projecting member $g^4$ which carries the wheel $f$. The member $g^2$ is pivotally connected at one end with the member $g^4$, and at the opposite end with the hub $a^5$, at the outside of one of the main engine steering wheels $a$. The several parts of the frame are connected by universal joints so that the frame is free to play up and down with the irregularities of the ground, the weight thereof, however, being sufficient to hold the guide wheel $f$ down in its place. It is obvious that any lateral movement of the guide wheel will be imparted to the frame, and that since the said frame pivots at $g^3$, it will produce, in its lateral movement, a slight longitudinal movement of the member $g^2$ which is imparted to the hub $a^5$ of the engine steering wheel, causing the said wheel to turn on the knuckle joints. This turning, or steering, movement is imparted in the usual way to the opposite steering wheel, thus causing the engine to follow the path in which it is steered by the action of the wheel $f$.

In order that the inclination of the steering wheel $f$ may be readily varied to suit different conditions, the said wheel itself is mounted on a knuckle $f^3$ in a socket $g^5$ of the frame member $g^4$, and the knuckle is provided with a radial arm $f^4$ connected by a link $f^5$ with an arm $f^6$ on a vertical rod $h$ which is pivoted in the front axle $b$ adjacent to the steering knuckle $a^2$. The said rod $h$ is provided with an arm $h^2$ at its upper end which connects with a link $k$ connecting the said arm with the sector arm $c$. The wheel $f$, therefore, can be turned on its vertical axis to vary its inclination, through the action of the steering rod $e$ at any time, whether prior to the starting of the machine or during the travel thereof. While the link $k$ is herein shown as connected with the automatic guide wheel, it is obvious that the same link may be utilized to connect the sector arm $c$ with the main steering knuckle when it is desired to change from one method of steering to the other.

The steering device above described is extremely simple and efficient, and very little trouble is required to disconnect the automatic devices, if the engine is to be driven any distance along the road, or is to be engaged in the performance of any work in which the automatic steering device is not required. Furthermore, the guide-wheel is entirely efficient in ordinary steering, the frame which holds the wheel having sufficient weight to give the wheel sufficient frictional contact with the ground to make it travel in the direction it is turned, and guide the main steering wheel accordingly. It is obvious that the means for connecting the steering frame controlled by the guide wheel with the steering wheel may be widely modified without departing from the invention, it being obvious that any connection between the steering frame and the main steering knuckle which causes the lateral swing of the frame due to the guide wheel to steer the machine will fully answer the purpose.

What I claim is:

1. In a steering gear for traction engines, the combination with the steering wheels mounted on vertically pivoted knuckles; of a guide wheel projecting forward beyond the steering wheels; a frame for said guide wheel having a pivotal connection with the frame of the traction engine, and another pivotal connection with one of said pivoted knuckles; and means for turning said guide wheel on a substantially vertical axis in the frame for said guide wheel.

2. In a steering gear for traction engines, the combination with the steering wheels mounted on vertically pivoted knuckles; of a guide wheel; a frame for said guide wheel, a part of which is pivotally connected to the front of the traction engine frame; and a link forming another part of said frame for the guide wheel, said link being pivotally connected with an axial projection from one of the steering wheels.

3. In a steering gear for traction engines, the combination with the steering wheels mounted on vertically pivoted knuckles; of a guide wheel projecting forwardly beyond said steering wheels and being adapted to bear laterally against a guiding surface; a frame for said guide wheel; universal joints connecting part of said frame with the front of the traction engine frame; a link forming another part of said frame; and a pivotal connection between said link and an axial projection from one of the steering wheels.

4. In a steering gear for traction engines, the combination with steering wheels mounted on vertically pivoted knuckles; of a guide wheel projecting forward of the engine wheels; a triangular frame for said guide wheel a part of which is pivotally connected to the traction engine frame; a link forming another part of said frame, and also constituting a connection between said frame and an axial projection from one of the engine steering wheels; and means for turning said guide wheel in a direction transverse to its axis to a position out of alinement with the engine wheels.

5. In a steering gear for traction engines, the combination with the main steering wheels of the traction engine, mounted on knuckles; of a triangular steering frame one member of which is pivoted to the front of the engine frame; a guide wheel mounted on a vertical axis at the end of said steering frame; an elbow lever on the engine frame; a link connecting the knuckle of the guide wheel to said elbow lever; an arm connected to the elbow lever; a steering rod geared to said arm; and a link forming the other member of the triangular steering frame, and constituting the means for connecting the said frame to the hub of one of the main steering wheels.

In testimony whereof, I have signed my name to this specification in the presence of two subscribing witnesses.

HARLEIGH PARKHURST.

Witnesses:
C. L. STURTEVANT,
MARGARET R. WRIGHT.

---

Copies of this patent may be obtained for five cents each, by addressing the "Commissioner of Patents, Washington, D. C."